(12) United States Patent
Hamelink et al.

(10) Patent No.: US 6,186,110 B1
(45) Date of Patent: Feb. 13, 2001

(54) PISTON SKIRT OIL SEAL

(75) Inventors: Joseph Hamelink, N. Muskegon; Daniel J. Wilkinson, Spring Lake, both of MI (US)

(73) Assignee: Dana Corporation, Toledo, OH (US)

( * ) Notice: Under 35 U.S.C. 154(b), the term of this patent shall be extended for 0 days.

(21) Appl. No.: 09/434,042

(22) Filed: Nov. 4, 1999

(51) Int. Cl.$^7$ ........................................ F02F 1/00
(52) U.S. Cl. ........................................ 123/193.4; 123/572
(58) Field of Search ........................ 123/193.1, 193.4, 123/193.6

(56) References Cited

U.S. PATENT DOCUMENTS

| | | |
|---|---|---|
| 3,847,513 | 11/1974 | Foster . |
| 4,381,648 | * 5/1983 | Balas ........................................ 60/517 |
| 4,773,305 | 9/1988 | Nissels . |
| 4,774,874 | 10/1988 | Adahan . |

\* cited by examiner

*Primary Examiner*—Marguerite McMahon
(74) *Attorney, Agent, or Firm*—Rader, Fishman & Grauer PLLC

(57) ABSTRACT

The invention is directed to a piston skirt oil seal system comprising a piston with a skirt operating in a cylinder chamber between an oil sump and a combustion chamber in an internal combustion engine. A first retainer attaches to the piston skirt, and a second retainer attaches to a cylinder wall defining the cylinder chamber above the oil sump. A boot made of a flexible, impervious membrane extends between the first and second retainers. The boot serves as a barrier preventing the migration of oil from the oil sump into the combustion chamber reducing the amount of unburned hydrocarbons introduced to the catalyst. To overcome gas leakage and friction, at least one self-lubricating or gas lubricated ring attaches to the piston above the boot. In an alternative embodiment, the boot forms an oil migration barrier through the use of a series of concentric rings linked together in a telescoping arrangement.

20 Claims, 1 Drawing Sheet

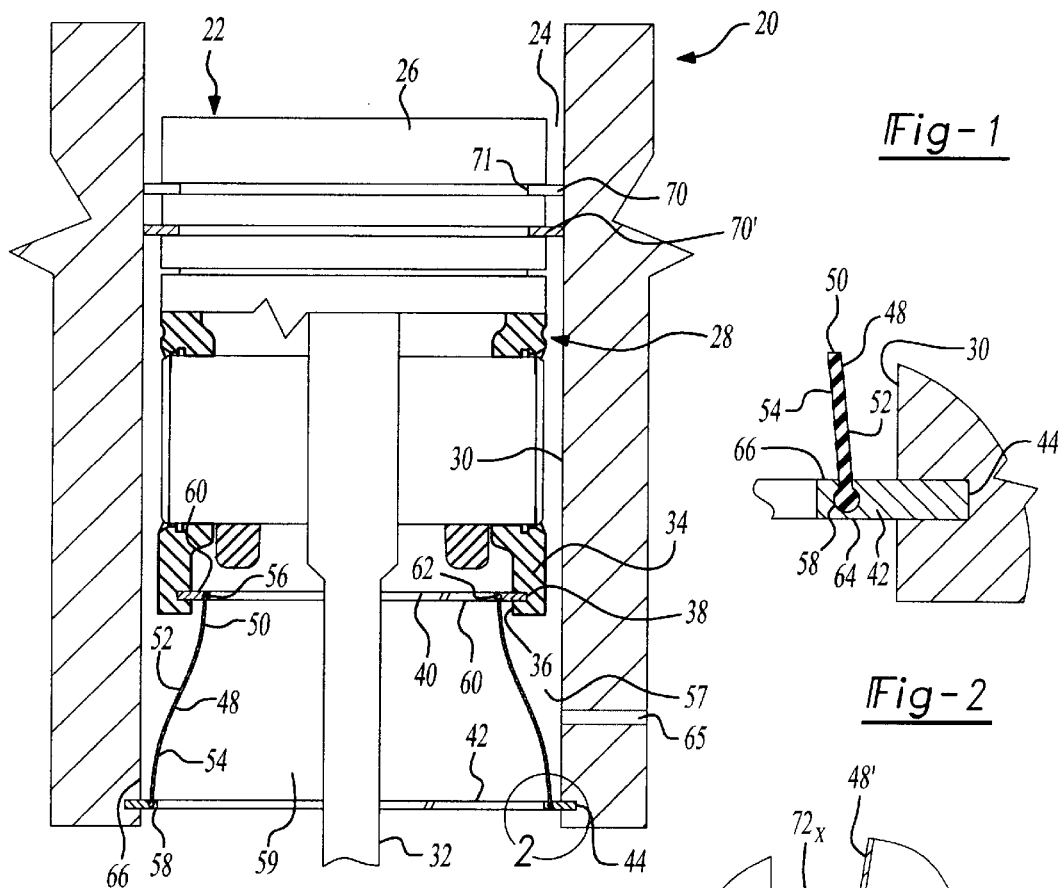
Fig-1
Fig-2
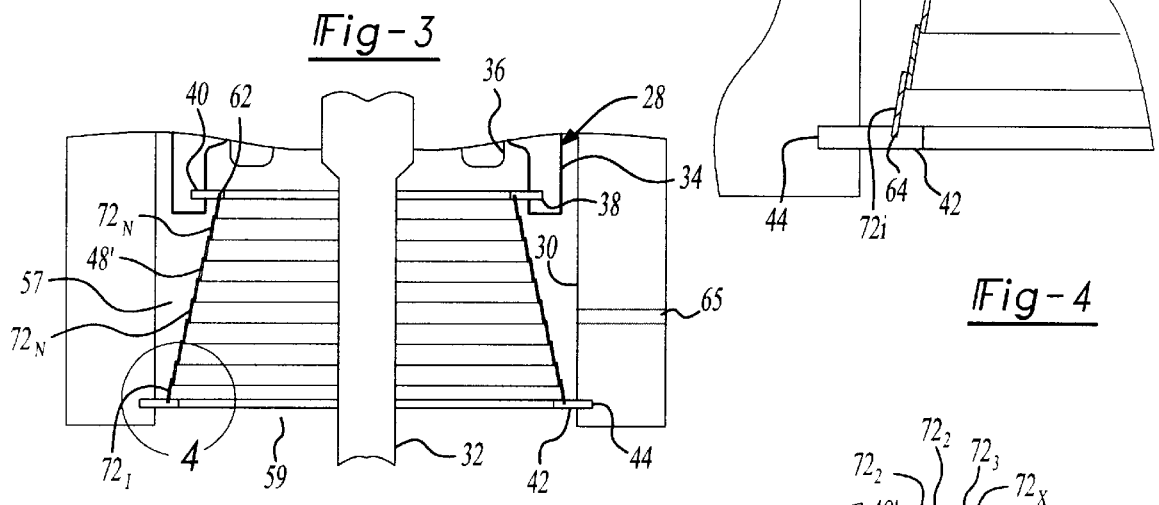
Fig-3
Fig-4
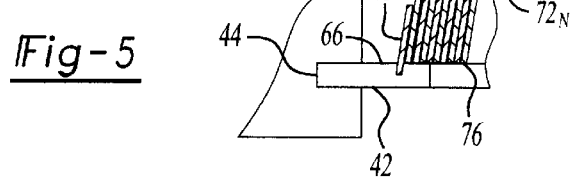
Fig-5

PISTON SKIRT OIL SEAL

FIELD OF THE INVENTION

The present invention relates to improvements made to a piston of an internal combustion engine of which a piston skirt oil seal system separates an oil sump and a combustion chamber of the internal combustion engine through the use of an impervious boot.

BACKGROUND OF THE INVENTION

Piston rings are well known. They are usually received within an annular groove disposed about an outer periphery of a piston. The piston reciprocates within a cylinder chamber of an internal combustion engine, compressing fluids such as gases within the cylinder into a combustion chamber. These fluids are ignited and expand within the combustion chamber, forcing the piston away from the point of ignition.

The primary function of piston rings is to provide an effective seal of the gases, called "blow-by control", and is accomplished by placing a first piston ring, called a compression seal, near the uppermost portion of the piston. The compression seal is designed to seal during an up-stroke of the piston to compress the gases within the chamber. A secondary function of piston rings is to prevent excess lubricating oil from entering the combustion chamber. To accomplish the secondary function, a second piston ring, called an oil seal, is placed below the compression seal to prevent oil from being carried up into the combustion chamber. Thus, the compression seal and the oil seal both cooperate to seal the combustion chamber from escaping gases or entering lubricating oil.

Generally, a piston reciprocating in a cylinder chamber creates a great deal of friction between the outer surface of the piston and the adjacent cylinder wall. Oil is used to lubricate the contacting surface between the piston and the cylinder wall. The oil used to lubricate tends to move up the cylinder wall from the oil sump, providing a smooth lubrication surface across which the piston may traverse. Commonly, excess oil from the oil sump migrates through the piston chamber and is allowed to move up the cylinder wall unrestrained. Inevitably, some oil passes the piston rings or seals designed to retard oil movement into the combustion chamber. Typically, the piston rings or seals wear through use causing the seals to fail and permitting unwanted oil to enter the combustion chamber. Additionally, piston rings also may not provide proper seals to contain oil because the rings tend not to effectively contact the cylinder wall due to pressure from blow-by gases that are created by explosions in the combustion chamber and the hydrodynamic influence of the oil on the cylinder wall. Blow-by gases tend to move out of the combustion chamber and down the cylinder wall. The pressure produced by the blow-by gases pushes the compression rings away from the cylinder wall. Consequently, oil on the cylinder walls may pass the rings and again enters the combustion chamber.

Once in the combustion chamber, the oil ignites. The burning of oil in the combustion chamber not only wastes oil, but it causes the internal combustion engine to emit unwanted excess noxious gases. Consequently, additional catalyst is required in the catalytic converter to treat the excess noxious gases prior to exhausting the gases into the environment.

To overcome these problems, pistons have been designed to encompass oil rings with openings used to drain oil. However, holes used to drain oil are typically susceptible to a problem called reverse oil pumping where oil flows from the interior of the piston through blow-by relief openings to the cylinder wall. This event may actually allow more oil to ultimately enter the combustion chamber. Accordingly, the problem of unwanted oil entering the combustion chamber from the piston chamber remains.

SUMMARY OF THE INVENTION

The invention is directed to a piston skirt oil seal system comprising a piston with a skirt operating in a cylinder chamber between an oil sump and a combustion chamber. A first O-shaped retainer is received into an annular groove circumscribed into a lower portion of the skirt, and a second O-shaped retainer is received into an annular groove circumscribed into a lower portion of a cylinder wall above the oil sump. A boot made of a flexible, impervious membrane with top and bottom edges is attached to the first and second O-shaped retainers, respectively, to separate the oil sump from the combustion chamber forming a barrier and essentially an oil free cylinder wall or an oil free zone. In an alternative embodiment, the boot comprises a series of concentric rings arranged between the first and second O-shaped retainers that telescope upwards and downwards with the reciprocation of the piston to serve as a barrier to oil migration.

The boot acts as a barrier to the migration of oil from the oil sump to the combustion chamber, reducing the amount of noxious gases and unburned hydrocarbons introduced to the catalyst for treatment in an internal combustion engine. Besides preserving the catalyst, the boot also saves oil that is otherwise wasted when it travels from the oil sump, through the cylinder chamber, and into the combustion chamber where it needlessly burns during the combustion process. The barrier also eliminates the problem of unwanted oil release into the combustion process. Ports provided in the cylinder wall below the piston ring travel and between the first and second O-shaped retainers in the oil-free zone remove blow-by gases generated during the combustion process. The absence of oil in the oil-free zone permits the ports to effectively remove the blow-by gases without concern that the ports will clog with oil, rendering the ports inoperable.

Without oil on the cylinder wall to lubricate the piston and rings, the piston and rings must be self-lubricating or gas lubricated. The self-lubricating piston and rings are provided of a carbon, graphite or similar coating to overcome friction generated from contact between the piston and cylinder wall as the piston reciprocates. Gas lubricated rings use gas present in the combustion chamber as its lubrication film source between the piston and cylinder wall as the piston reciprocates. The self-lubricating or gas lubricated piston and rings eliminate the need for oil to be present throughout the cylinder wall.

BRIEF DESCRIPTION OF THE DRAWINGS

The features and inventive aspects of the present invention will become more apparent upon reading the following detailed description, claims, and drawings, of which the following is a brief description:

FIG. 1 is a longitudinal cross-section view of a piston in a cylinder according to the instant invention.

FIG. 2 is an exploded cross-sectional view of a membrane boot attaching to a retainer as shown by encircled region 2 of FIG. 1.

FIG. 3 is a longitudinal cross-section view of a piston in a cylinder of an alternative embodiment of the instant invention.

FIG. 4 is an exploded cross-sectional view of a telescoping boot attaching to a retainer as shown by encircled region 4 of FIG. 3.

FIG. 5 is an exploded cross-sectional view of the telescoping boot in a collapsed position.

DETAILED DESCRIPTION OF A PREFERRED EMBODIMENT

A cylinder assembly 20 used in an internal combustion engine is illustrated in FIG. 1. The cylinder assembly 20 includes a piston 22 residing in a cylinder chamber 24 extending between an oil sump and a combustion chamber of the internal combustion engine (not shown). Piston 22 includes a piston crown 26 formed with a downwardly extending skirt 28. Connecting rod 32, at its upper end, connects to piston skirt 28 by a pin or other fastening mechanism commonly known in the art. Connecting rod 32 connects at its lower end to a crankshaft (not shown), which cycles and drives connecting rod 32 with an intake and discharge strokes causing piston 22 to reciprocate inside of cylinder 24 between a cylinder wall 30 that longitudinally surrounds piston 22.

Skirt 28 possesses a lower portion 34. An inside wall 36 of lower portion 34 of piston skirt 28 carries a groove 38 circumscribed about inside wall 36. A first generally O-shaped retainer 40 is received into first groove 38. Retainer 40 possesses a thickness slightly greater than first groove 38, thereby enabling a tight mechanical in groove 38 when retainer 40 attaches to piston skirt 28. Once attached to piston skirt 28, retainer 40 lies in a plane generally perpendicular to connecting rod 32, which threads the center of retainer 40.

A second generally O-shaped retainer 42 is received into a second groove 44 circumscribed in cylinder wall 30 of cylinder chamber 24 at a location above the oil sump and below O-shaped retainer 40. Like retainer 40, retainer 42 possesses a thickness slightly greater than second groove 44, thereby enabling a tight mechanical fit in first groove 38 when retainer 40 attaches to cylinder wall 30 of cylinder 24. Once attached to cylinder wall 30, retainer 42 lies in a plane generally parallel to retainer 40 and is generally perpendicular to connecting rod 32, which also threads the center of retainer 42.

A boot 48 is disposed between first retainer 40 and second retainer 42. Boot 48 may be made for a variety of impervious and flexible materials or fabric. Preferably, boot 48 comprises a rubber-like membrane that is both heat resistant and possesses a long fatigue life. Boot 48 is defined by a membrane wall 50 generally molded into a frusto-concial shape with a hollow interior forming a tubular structure. Membrane wall 50 of boot 48 supports an outside surface 52, an inside surface 54, a top rim 56 and a bottom rim 58. Top rim 56 of boot 48 is defined by a diameter less than a diameter that defines bottom rim 58. Top rim 56 connects to piston skirt 28 by attachment to first retainer 40. Similarly, bottom rim 58 connects to cylinder wall 30 by attachment to second retainer 42.

Once attached to retainers 40 and 42, boot 48 divides cylinder chamber 24 into an oil-free zone 57 and an oil zone 59. Oil-free zone 57 is defined as the space inside cylinder chamber 24 between outside surface 52 of boot 48 and the combustion chamber. Oil zone 59 comprises the remaining space in cylinder chamber 22 from inside surface 54 to the oil sump. Boot 48, in combination with retainers 40 and 42, act as a barrier, preventing the migration of oil from the oil sump up cylinder wall 30. Although oil from the oil sump may still enter oil zone 59, boot 48 will prevent the oil from working its way up cylinder wall 30 to ultimately enter the combustion chamber. Above retainer 42, cylinder wall 30 is free of oil, thereby preventing the migration of oil into the combustion chamber. Thus, oil waste is eliminated along with the production of unwanted excess noxious gas resulting from the burning of oil in the combustion chamber.

Ports 65 are provided in cylinder wall 30 in oil-free zone 57 to remove blow-by gases created by fuel/air explosions in the combustion chamber. Ports 65 connect cylinder chamber 24 to the oil sump to divert blow-by gases that move out of the combustion chamber and down the cylinder wall during engine operation. The oil sump serves as a low-pressure area relative to the pressure in cylinder chamber 24 as is typical of positive crankcase ventilation (PCV) systems commonly employed in the art. The low pressure in the oil sump causes ports 65 to act as a vacuum drawing the blow-by gases under high pressure in cylinder chamber 24 into the oil sump. The location of ports 65 in oil-free zone 57 permits the efficient removal of blow-by gases from cylinder chamber 24 without the potential of ports 65 becoming blocked or clogged by oil from the oil sump that would occur if oil served as a lubricant in cylinder chamber 24.

In one embodiment of the invention, retainers 40 and 42 are retainer snap rings (hereafter designated as first retainer snap ring 40' and second retainer snap ring 42', respectively). As previously described, first retainer snap ring 40' possesses an outward tangential force that is received and retained through a tight mechanical fit into first groove 38 located in inside wall 36 of lower portion 34 of piston skirt 28. Likewise, second retainer snap ring 42' possesses an outward tangential force that is received and retained through a tight mechanical fit into second groove 44 circumscribed in cylinder wall 30 of cylinder chamber 24 at a location above the oil sump and below first retainer snap ring 40.

A first channel 62, circumscribed into a bottom surface 60 of first retainer snap ring 40', receives top rim 56 of boot 48. Similarly as shown FIG. 2, a second channel 64, circumscribed into a top surface 66 of second retainer snap ring 42' receives bottom rim 58 of boot 48. Top rim 56 and bottom rim 58 are provided with excess material to permit a tight mechanical fit when disposed into first channel 62 and second channel 64, respectively, to prevent separation of boot 48 from either first retainer snap ring 40' or second retainer snap ring 42' while piston 22 reciprocates in cylinder chamber 24. Connecting rod 32 is centered through boot 48.

In an alternative embodiment, retainer 40, retainer 42, and boot 48 comprise a single integral unit molded of the same impervious material. The use of a single integral unit eliminates the need for first channel 62 and second channel 64, avoiding the potential for separation of boot 48 from retainer 40 or retainer 42. Moreover, the alternative embodiment provides simplified installation of boot 48 into cylinder chamber 24 by eliminating elements that would otherwise have to be installed.

In operation, boot 48 collapses with the intake and expansion strokes of piston 22 and expands with the compression and exhaust strokes of piston 22. On the intake and expansion strokes of piston 22, membrane wall 50 of boot 48 collapses inward onto itself into near top surface 66 of second O-shaped retainer 42. To avoid wear to membrane wall 50, boot 48 attaches to first retainer 40 at a location distant from piston rod 32 to prevent contact between boot 48 and connecting rod 32 while boot 42 is collapsed.

Likewise to further prevent wear to membrane wall 50, boot 48 attaches to second retainer 42 at a location distant from cylinder wall 30 to prevent contact between boot 48 and cylinder wall 30 when boot 42 is collapsed. When piston 22 enters its compression and exhaust stroke powering piston 22 upwards through cylinder chamber 30, membrane wall 50 of boot 48 unfolds and stretches, expanding upwards following piston crown 26. To overcome wear to the membrane wall 50 from the repetitive collapsing and expanding associated with the reciprocating cycle of piston 22, boot 48 must be made from a flexible, but resilient material to avoid fatigue in the material that will cause membrane wall 50 to crack or otherwise become damage thereby permitting oil to pass through membrane wall 50 and containment oil-free zone 57.

To overcome gas leakage and friction generated in the movement of the piston reciprocating in cylinder chamber 24, at least one piston ring 70 attaches to piston crown 26. Piston ring 70 is retained on piston crown 26 through a free mechanical fit into groove 71 circumscribed into piston crown 26. Piston ring 70 extends outwards from piston crown 26 through cylinder chamber 24 to contact with cylinder wall 30 equally on all sides to center piston 22 in cylinder chamber 30. To aid in the movement of piston 22, piston ring 70 comprises a self-lubricating material, such as carbon, Teflon®, graphite, or other coating, permitting piston 22 to move up and down between cylinder wall 30 overcoming friction caused by the reciprocation of piston 22. Piston ring 70, alternatively, is a gas lubricated ring, comprised of a material that can use combustion gas present in the combustion chamber as its only lubrication film. The self-lubricating or gas lubricated nature of piston ring 70 and piston 22 eliminates the need for an external source of lubrication in cylinder chamber 24, such as oil from the sump. Additionally, piston ring 70 also minimizes the migration of fuel and blow-by gases introduced into cylinder chamber 24 above piston crown 26 during each piston cycle from entering oil-free zone 57 and damaging the integrity of boot 48. Preferably, two piston rings 70 and 70' will be employed in tandem to center piston 22 and overcome gas leakage and friction caused by the reciprocation of piston 22 in cylinder chamber 24. The dual use of piston rings 70 and 70' also provides a back up for either piston ring 70 or 70' in the event of failure or wear to either piston ring.

FIG. 3 illustrates an alternative embodiment of the instant invention. Here, boot 48' comprises a series of concentric, telescoping rings $72_1$–$72_N$, where "N" is determined from the design characteristics of a specific engine. Rings $72_1$–$72_N$ are made from strips of impervious, rigid material, such as plastic or metallic, formed into a circular structure. Rings $72_1$–$72_N$ possess an outside diameter defined by the circumference of its outside peripheral surface and a slightly smaller inside diameter defined by the circumference of its inside peripheral surface. Ring $72_1$ possesses the largest diameter of all rings $72_1$–$72_N$ and ring $72_N$ possesses the smallest diameter of all rings $72_1$–$72_N$. Ring $72_2$ possesses an outside diameter that corresponds generally to the inside diameter of ring $72_1$, but is sized to permit ring $72_2$ to fit snugly inside of ring $72_1$. Likewise, ring $72_3$ possesses an outside diameter that corresponds generally to the inside diameter of ring $72_2$, but is sized to permit ring $72_3$ to fit snugly inside of ring $72_2$. The same pattern continues for all rings $72_1$–$72_N$ providing for an arrangement of rings $72_1$–$72_N$ with the next consecutive ring $72_x$ residing inside the previous ring $72_{x-1}$ to permit the telescoping of rings $72_1$–$72_N$ upwards and downwards as piston 22 reciprocates in cylinder chamber 24.

FIG. 4 shows the interconnection of a telescoping boot 48' and second O-shaped retainer 42. Ring $72_1$ attaches to top surface 66 of second O-shaped retainer 42 through a tight mechanical fit into second channel 64. Likewise, Ring $72_N$ attaches to bottom surface 60 of first O-shaped retainer 40 through a tight mechanical fit into first channel 62. Interconnected between ring $72_1$ and ring $72_N$ are rings $72_2$ through $72_{N-1}$. Rings $72_1$–$72_N$ possess a first small lip protruding outwards from its bottom edge and a second small lip protruding inwards form its top edge. Consecutive rings $72_1$–$72_N$ link together, wherein the second small lip of ring $72_x$ engages the first small lip of the next consecutive ring $72_{x+1}$ locking rings $72_1$–$72_N$ together when rings $72_1$–$72_N$ telescope upwards as piston 22 reciprocates in cylinder chamber 24.

FIG. 5 shows telescoping boot 48' in a collapsed position. In operation, boot 48' expands with the exhaust and compression strokes of the engine and collapses with the expansion and intake strokes of piston 22. On the intake and expansion strokes of piston 22, telescoping concentric rings $72_1$–$72_N$ of boot 48' collapse inward into a coil-like arrangement 76 near top surface 66 of second O-shaped retainer 42. When piston 22 enters its compression and exhaust stroke, powering piston 22 upwards through cylinder chamber 24, telescoping concentric rings $72_1$–$72_N$ of boot 48' expand upwards following piston head 26 engaging the first small lip and second small lip of each consecutive ring $72_1$–$72_N$ to stack rings $72_1$–$72_N$ adjacent to and above the proceeding ring. FIGS. 3 and 4 illustrate telescoping boot 48' in its expanded position acting as an impervious barrier preventing the migration of oil from the oil zone 59 to oil-free zone 57.

The disclosed embodiments and examples are given to illustrate the present invention. However, they are not meant to limit the scope and spirit of the present invention. Therefore, the present invention should be limited only by the appended claims.

What is claimed is:

1. A boot extending between a skirt of a piston and a cylinder wall of a cylinder chamber of an internal combustion engine between an oil sump and a combustion chamber comprising:

a top rim and a bottom rim;

an impervious wall extending between said top rim and said bottom rim;

a first retainer and a second retainer;

said top rim attaching to said first retainer and said bottom rim attaching to said second retainer;

said first retainer connecting to the skirt of the piston and said second retainer connecting to the cylinder wall of the cylinder chamber, and wherein said boot serves as a barrier separating the oil sump from the combustion chamber.

2. A boot as in claim 1, wherein at least one of said first retainer and said second retainer is a snap ring.

3. A boot as in claim 1, wherein said first retainer is received into a groove circumscribed into a lower portion of the piston skirt and said second retainer is received into a groove circumscribed into a lower portion of the cylinder wall of the cylinder chamber.

4. A boot as in claim 1, wherein said wall supports a frusto-conical shape.

5. A boot as in claim 1, wherein said wall is made of a flexible material that is impervious to the transport of oil.

6. A boot as in claim 1, wherein said wall comprises a series of telescoping concentric rings.

7. A boot as in claim 1, wherein said series of telescoping concentric rings include individual rings linked together between a first individual ring and a last individual ring in a consecutive pattern, with each individual ring of said series of concentric rings being slightly smaller in diameter than said individual ring proceeding.

8. A boot as in claim 1, wherein said wall, said first retainer, and said second retainer are integral.

9. A piston connected to a connecting rod extending through and actuating in a cylinder chamber of an internal combustion engine between an oil sump and a combustion chamber comprising:

a piston skirt;

a first retainer connected to a lower portion of said piston skirt;

a second retainer connected to a lower portion of said cylinder chamber;

a boot with a top rim and a bottom rim, wherein said connecting rod threads said boot and said top rim of said boot attaches to said first retainer and said bottom rim of said boot attaches to said second retainer separating the oil sump from the combustion chamber and defining an oil-free zone within said cylinder chamber.

10. A piston as in claim 9, wherein at least one of said first retainer and said second retainer is a snap ring.

11. A piston as in claim 9, wherein said first retainer is received into a groove circumscribed into said lower portion of said piston skirt and said second retainer is received into a groove circumscribed into said lower portion of a cylinder wall of said cylinder chamber.

12. A piston as in claim 9, wherein said boot supports a frusto-conical shape.

13. A piston as in claim 9, wherein at least one self-lubricating or gas lubricated ring attached to said piston above said boot.

14. A piston as in claim 9, wherein said boot is made of a flexible material that is impervious to the transport of oil.

15. A piston as in claim 9, wherein said boot comprises a series of telescoping concentric rings.

16. A piston as in claim 15, wherein said series of telescoping concentric rings include individual rings linked together between a first individual ring and a last individual ring in a consecutive pattern, with each individual ring of said series of concentric rings being slightly smaller in diameter than said individual ring proceeding.

17. A piston as in claim 9, wherein said boot, said first retainer, and said second retainer are integral.

18. A piston system for use in an internal combustion engine comprising:

a piston with a piston crown, with said piston connected to a connecting rod extending through and reciprocating in a cylinder chamber between an oil sump and a combustion chamber;

a piston skirt extending downward from said piston crown;

an impervious boot with a top edge and a bottom edge;

said top edge of said boot connects to said piston skirt and said bottom edge of said boot connects to a wall of said cylinder chamber to separate said oil sump from said combustion chamber, defining an oil-free zone within said cylinder chamber and prevent oil migration from said oil sump into said combustion chamber;

said connecting rod threads said boot;

at least one self-lubricating or gas lubricated ring attached to said piston; and at least one port provided in said cylinder chamber to remove gases from said cylinder chamber.

19. A piston system as in claim 18, further comprising a first retainer received into a groove circumscribed into a lower portion of said piston skirt and a second retainer received into a groove circumscribed into a lower portion of said cylinder chamber, wherein said top edge of said boot attaches to said first retainer and said bottom edge of said boot attaches to said second retainer.

20. A piston system as in claim 18, wherein said boot comprises a series of telescoping concentric rings, including individual rings linked together between a first individual ring and a last individual ring in a consecutive pattern, with each individual ring of said series of concentric rings being slightly smaller in diameter than said individual ring proceeding.

* * * * *